(12) United States Patent
Stahlmann et al.

(10) Patent No.: US 11,545,166 B2
(45) Date of Patent: Jan. 3, 2023

(54) USING METADATA TO AGGREGATE SIGNAL PROCESSING OPERATIONS

(71) Applicant: DOLBY INTERNATIONAL AB, Amsterdam Zuidoost (NL)

(72) Inventors: Alexander Stahlmann, Bubenreuth (DE); Reinhold Boehm, Nuremberg (DE); Mark C. Leddy, Nuremberg (DE); Karsten Linzmeier, Nuremberg (DE); Vinay Mathew, Fuerth (DE); Simon Plain, Nuremberg (DE); Heiko Purnhagen, Sundbyberg (SE); Leif Sehlström, Järfälla (SE); Robin Thesing, Nuremberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 86 days.

(21) Appl. No.: 16/917,931

(22) Filed: Jul. 1, 2020

(65) Prior Publication Data

US 2021/0005211 A1 Jan. 7, 2021

Related U.S. Application Data

(60) Provisional application No. 62/869,716, filed on Jul. 2, 2019.

(30) Foreign Application Priority Data

Jul. 2, 2019 (EP) .................... 19184025

(51) Int. Cl.
*G10L 19/16* (2013.01)
*H04L 65/75* (2022.01)
*G10L 19/008* (2013.01)

(52) U.S. Cl.
CPC .......... *G10L 19/167* (2013.01); *G10L 19/008* (2013.01); *H04L 65/75* (2022.05)

(58) Field of Classification Search
CPC ..... G10L 19/167; G10L 19/16; G10L 19/008; H04L 65/601; H04L 65/607; H04L 65/80;
(Continued)

(56) References Cited

U.S. PATENT DOCUMENTS 8,315,396 B2 11/2012 Schreiner
8,553,504 B2 * 10/2013 Lindahl .................... H04R 5/04
369/2

(Continued)

FOREIGN PATENT DOCUMENTS

EP 3319341 5/2018
EP 3378241 9/2018
(Continued)

OTHER PUBLICATIONS

Herre, J. et al "MPEG-H 3D Audio—The New Standard for Coding of Immersive Spatial Audio" IEEE Journal of Selected Topics in Signal Processing, vol. 9, No. 5, Aug. 2015, pp. 770-779.
(Continued)

*Primary Examiner* — Leshui Zhang

(57) ABSTRACT

A technique including receiving and decoding a coded bitstream encoded with audio content including first audio objects corresponding to a first media content type of two consecutive media content types and second audio objects corresponding to a second media content type of the two consecutive media content types, and audio metadata corresponding to the audio content. The audio metadata including first and second audio object gains, for the first and second audio objects, generated in part based on a first fading curve of the first media content type and a second fading curve of the second media content type, respectively.

(Continued)

The technique further includes applying the first and second audio object gains to the first and second audio objects, and rendering a sound field represented by the first audio object with the applied first audio object gain and the second audio object with the applied second audio object gain.

20 Claims, 9 Drawing Sheets

(58) Field of Classification Search
CPC ....... H04L 65/605; H04L 29/06; H04S 3/008; H04S 3/00; H04S 2400/11; H04S 2400/13; H04S 2400/167; H04S 7/30; G06F 3/165; H04R 27/00
USPC ......... 704/500–504; 381/1–23, 61, 104–110; 700/94
See application file for complete search history.

(56) References Cited

U.S. PATENT DOCUMENTS

| | | |
|---|---|---|
| 8,615,088 B2 | 12/2013 | Oh |
| 9,721,575 B2 | 8/2017 | Dressler |
| 10,251,016 B2 | 4/2019 | Jot |
| 10,276,173 B2 | 4/2019 | Baumgarte |
| 2010/0076772 A1 | 3/2010 | Kim |
| 2014/0288686 A1* | 9/2014 | Sant .................. G06F 3/165 700/94 |
| 2014/0355786 A1* | 12/2014 | Betbeder .................. H03G 9/02 381/98 |
| 2016/0007133 A1* | 1/2016 | Mateos Sole ........... H04S 3/008 381/18 |
| 2016/0157039 A1 | 6/2016 | Disch |
| 2016/0219391 A1* | 7/2016 | Ward .................. G10L 19/008 |
| 2016/0240204 A1* | 8/2016 | Kuech .................. G06F 3/165 |
| 2017/0032793 A1 | 2/2017 | Baumgarte |
| 2018/0190303 A1 | 7/2018 | Ghido |
| 2018/0357038 A1 | 12/2018 | Olivieri |
| 2019/0028827 A1 | 1/2019 | Ward |
| 2019/0289420 A1 | 9/2019 | Makinen |

FOREIGN PATENT DOCUMENTS

| | | |
|---|---|---|
| WO | 2008063035 | 5/2008 |
| WO | 2013111034 A2 | 8/2013 |
| WO | 2015010998 | 1/2015 |
| WO | 2015038475 | 3/2015 |
| WO | 2019175472 A1 | 9/2019 |
| WO | 2020012067 A1 | 1/2020 |

OTHER PUBLICATIONS

Riedmiller, J. et al "Delivering Scalable Audio Experiences Using AC-4" IEEE Transactions on Broadcasting, vol. 63, No. 1, Mar. 2017, pp. 179-201.

* cited by examiner

USING METADATA TO AGGREGATE SIGNAL PROCESSING OPERATIONS

CROSS-REFERENCE TO RELATED APPLICATIONS

This application claims priority of the following priority applications: U.S. provisional application 62/869,716 filed 2 Jul. 2019 and EP application 19184025.5 filed 2 Jul. 2019, each of which is incorporated by reference in its entirety.

TECHNOLOGY

The present invention pertains generally to processing audio signals and pertains more specifically to using object audio metadata (OAMD) to aggregate signal processing operations.

BACKGROUND

Multiple audio processors are scattered across an end-to-end audio processing chain to deliver audio content to end user devices. Different audio processors may perform different, similar and/or even repeated media processing operations. Input media data as received at the beginning of the audio signal path undergoes many audio sample data manipulations, conversions, and modifications throughout the audio processing chain. Certain operations such as soft or hard peak limiting may be performed by more than one audio processor in the same processing chain or by audio processors not directly involved in audio rendering. Some of these operations to varying extents may be irreversible, inefficient, computationally intensive, and/or prone to introducing artifacts, unintended results, delays, complexity, coding/quantization errors, or the like.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
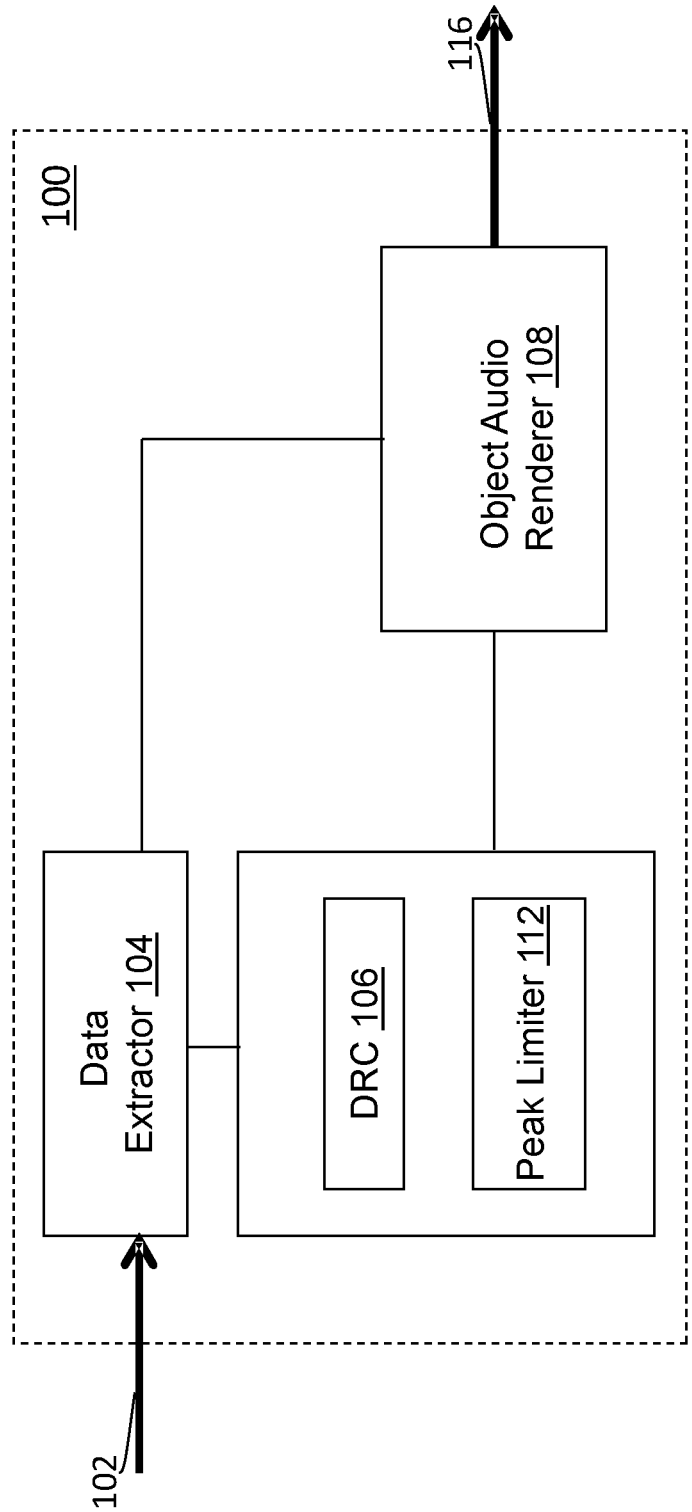
FIG. 1A illustrates an example object audio decoder or downstream audio processor.

Example embodiments, which relate to using OAMD to aggregate signal processing operations to be performed at or near the end of an audio processing chain, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. DOWNSTREAM PROCESSOR WITH AUDIO RENDERING
3. UPSTREAM PROCESSOR PRIOR TO AUDIO RENDERING
4. PEAK LIMITING
5. CROSS FADING
6. PROGRAM MIXING
7. IMPLEMENTATION MECHANISMS—HARDWARE OVERVIEW
8. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

A signal modification operation—if performed instead of deferred—refers to an audio processing operation that modifies position-less audio sample data (e.g., PCM signals, non-PCM audio sample signals, frequency domain audio sample signals, transform domain audio sample signals, etc.).

Techniques as described herein can be used to identify signal modification operations (e.g., commonly, typically, routinely, etc.) performed by non-rendering upstream audio processors and defer these signal modification operations instead to be performed by a (downstream) audio rendering stage in an end-to-end audio processing chain. The audio rendering stage refers to an audio processor/stage (at the end of the audio processing chain) operating with actual speakers in a specific playback environment to reproduce or render a sound field represented by audio content delivered to the audio processor/stage through the audio processing chain.

For simplicity, these signal modification operations may be generally referred to as deferred or aggregated signal modification operations. Example deferred or aggregated signal modification operations may include, but are not necessarily limited to only, encoder-deferred or encoder-aggregated operations. In some operational scenario, a deferred (or aggregated) operation may refer to any signal modification operation deferred from a non-rendering stage (or an upstream audio processor) of the end-to-end audio processing chain to the audio rendering stage (or downstream audio processor) of the same chain, regardless of whether the non-rendering stage is a part of an audio encoder and/or regardless of whether the rendering stage is a part of an audio decoder and/or regardless of how an overall system involved in audio processing may be split into various codecs or various sub-chains of codecs.

Instead of performing the deferred signal modification operations, an upstream audio processor such as an object audio encoder can generate audio object gain components for the deferred signal modification operations and include/ merge these gain components into audio object gains in OAMD that is to be delivered to an audio rendering stage.

Example audio object gain components for deferred signal modification operations may include, normalization gain information for deferred peak limiting operations, cross fading gains for deferred cross fading operations, program mixing gains for deferred program mixing operations, etc.

As the audio object gain components are included or merged as part of the overall audio object gains, the audio object gain components are implicitly and/or automatically applied to the position-less audio sample data of the audio objects when the audio rendering stage applies the overall audio object gains to the position-less audio sample data of the audio objects. As a result, these deferred operations—which the upstream audio processor is freed from performing—are implicitly and/or automatically performed by the audio rendering stage.

Example advantages of techniques as described herein include, but are not necessarily limited to only, a significant reduction of system complexity—especially computational complexity—as well as a (e.g., potential, significant, etc.) improvement in the quality of the rendered acoustic output. By applying these techniques, multiple operations on the audio data (e.g., PCM samples, time-frequency samples in a QMF matrix, frequency domain audio samples, transform domain audio samples, etc.) are aggregated to the end of the audio processing chain such as the rendering stage implemented by an object audio decoder to reduce overall computational complexity and/or to decrease the number of different components in the overall system and/or to avoid the adverse effects of multiple direct signal modifications (e.g. these operations may be prone to cause a loss of precision/resolution in processing devices with limited dynamic range, etc.).

For example, rounding and/or quantization errors that may be repeatedly introduced in coding and decoding intermediate results of performing these signal modification operations in the middle of the signal processing chain can be eliminated or significantly reduced.

In some embodiments, mechanisms as described herein form a part of a media processing system, including but not limited to: an audiovisual device, a flat panel TV, a handheld device, game machine, television, home theater system, tablet, mobile device, laptop computer, netbook computer, cellular radiotelephone, electronic book reader, point of sale terminal, desktop computer, computer workstation, computer kiosk, various other kinds of terminals and media processors, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. DOWNSTREAM PROCESSOR WITH AUDIO RENDERING

An audio program (or the audio portion of an audiovisual program) may be represented as object audio, which includes position-less audio sample signals and corresponding audio metadata. The position-less audio sample signals in the object audio carry position-less audio sample data of one or more audio objects, whereas the corresponding audio metadata in the object audio carries corresponding gains and positions of the audio objects. OAMD refers to a (e.g., standardized, proprietary, in accordance with a standard or proprietary bitstream coding syntax, etc.) way of transmitting audio or audiovisual metadata in a coded bitstream (e.g., encoded with object audio representing one or more audio programs, etc.) from upstream audio processors, such as object audio encoders, to downstream audio processors including but not limited to audio reproduction devices operating in diverse playback environments.

Audio metadata transmitted by way of OAMD to a given audio reproduction device may include audio metadata portions (e.g., positions, gains, etc.) that guide, an object audio renderer (implementing some or all of an audio rendering stage) of the given reproduction device, different aspects of rendering audio objects in a specific playback environment in which the given audio reproduction device operates. Different audio metadata portions may be sent for different auditory scenes or subdivisions thereof to reflect changes in the auditory scenes.

As used herein, an audio object may refer to audio sample data in a position-less (audio sample) signal in combination with corresponding position information of the audio sample data in the OAMD; the position information may indicate positions of an audio source to be depicted in a sound scene as emitting sounds represented by the audio sample data. Additionally, optionally or alternatively, in some operational scenarios, such audio object may further comprise audio object gains relating to (the audio sample data of) the audio object. In some operational scenarios, at or near the end of an audio processing chain, an audio renderer (e.g., an audio object renderer, etc.) implicitly and/or automatically applies gains specified for audio objects to audio sample data of the audio objects as a part of audio (object) rendering operations, regardless of whether the specified gains are for normal rendering operations, deferred operations or other operations.

Techniques as described herein can be used to support aggregating audio processing operations entirely or partly deferred by an upstream audio processor such as an object audio encoder and enabling the deferred audio processing operations to be performed entirely or partly performed by a downstream recipient audio processor such as an object audio decoder implementing the audio rendering stage. Example deferred operations may include, but are not necessarily limited to only, relatively complex and time-consuming audio processing operations involving modifying audio sample data (e.g., PCM samples, time-frequency samples in a QMF matrix, frequency domain audio samples, transform domain audio samples, etc.) in position-less audio sample signals.

FIG. 1A illustrates an example downstream audio processor such as an object audio decoder 100 comprising an object audio data extractor 104, dynamic range controller 106, a peak limiter 112, an object audio renderer 108, etc.

Some or all of the components in the object audio decoder (100) may be implemented in hardware, software, a combination of hardware and software, etc.

In some operational scenarios, the object audio data extractor (104) receives an encoded input signal 102. An encoded input signal as described herein may be a bit stream encoded in accordance with a (e.g., standardized, proprietary, customized, etc.) bitstream coding syntax. The input signal (102) contains encoded (e.g., multiplexed, compressed, etc.) input audio data frames and object audio metadata (OAMD).

The object audio data extractor (104) extracts and/or decodes the input audio data frames and the OAMD from the encoded input signal (102). Each of the input audio data frames comprises a plurality of coded audio data blocks each of which represent a plurality of audio samples. Each frame represents a time interval (e.g., 8 milliseconds or ms, 10 ms, 20 ms, etc.) comprising a certain number of audio samples. The frame size may vary with the sample rate and coded data rate. The audio samples are quantized audio data elements (e.g., input PCM samples, input time-frequency samples in a QMF matrix, input frequency domain audio samples, input transform domain audio samples, etc.) representing spectral content in one, two or more (audio) frequency bands or frequency ranges. The quantized audio data elements in the input audio data frames may represent pressure waves in a digital (quantized) time or transform domain. The quantized audio data elements may cover a finite range of loudness levels at or below a largest possible value (e.g., a clipping level, a maximum loudness level, etc.).

The OAMD can be used by a wide variety of recipient decoder to process the input audio data frames. The OAMD may include some or all of: audio object gains, operational parameters relating to one or more operations (e.g., downmixing, upmixing, partial mixing, etc.) to be performed by the object audio decoder (100), one or more dynamic range compression curves, normalization parameters relating to loudness levels represented in the input audio data frames, etc. A loudness level may refer to a (e.g., psychoacoustic, perceptual, etc.) level of loudness in an entire program (e.g., a movie, a TV program, a radio broadcast, etc.), a portion of a program, a dialogue of a program, etc.

The input audio data frames may represent position-less audio sample signals for one or more audio objects to be rendered. The OAMD may include (metadata) portions such as audio object gains corresponding to the one or more audio objects. The OAMD may include (metadata) portions to describe properties such as positions, velocities, sizes, etc., of the audio objects. Additionally, optionally or alternatively, the OAMD may include (metadata) portions to (e.g., implicitly, explicitly, etc.) specify audio processing operations (e.g., peak limiting, cross-fading, main and associated program mixing, etc.) that have been deferred or avoided by an object audio encoder (e.g., 150 of FIG. 1B, etc.) that generated the encoded input signal (102). Additionally, optionally or alternatively, the OAMD includes specific instructions and/or operational parameters that have been generated by the object audio encoder (150) for the object audio decoder (100) to perform the deferred audio processing operations as a part of, or in addition to, audio rendering operations in connection with the audio objects.

The operation and functions of the object audio decoder (100), or some or all of the modules (e.g., the object audio data extractor 104, the dynamic range controller 106, the peak limiter 112, the object audio renderer 108, etc.), may be adapted in response to the OAMD extracted from the encoded input signal (102). For example, the OAMD such as audio object gains, operational parameters for audio processing operations (e.g., downmixing, upmixing, partial mixing, etc.), dynamic range compression curves, loudness levels, normalization gains, cross-fading gains, audio object gains, etc., may be used by the object audio decoder (100) to perform audio processing operations on the audio objects and generate output audio data elements (e.g., output PCM samples, output time-frequency samples in a QMF matrix, output frequency domain audio samples, output transform domain audio samples, etc.) in a digital transform or time domain. These audio processing operations may include but are not limited to a subset of deferred audio processing operations (e.g., peak limiting, cross-fading, main and associated program mixing, etc.) previously aggregated by the object audio encoder (150) by way of including specific gain components for the deferred audio processing operations in overall audio object gains carried in the OAMD. The output data elements can then be used to drive audio channels or speakers of an actual audio channel configuration operating with the object audio decoder (100) in a specific playback environment to render the audio objects represented in the encoded input signal (102).

In some embodiments, the dynamic range controller (106) is configured to receive some or all of the audio objects and the OAMD decoded (e.g., demultiplexed, decompressed, etc.) from the input signal (102), perform audio processing operations (e.g., dynamic range control operations, gain smoothing operations, normalizing gain operations, cross-fading gain operations in connection with consecutive programs, gain operations in connection with mixing concurrent programs such as mixing main and associated programs, etc.) on the audio objects based at least in part on the OAMD extracted from the encoded audio signal (102), etc.

Dynamic Range Control (DRC) refers to time-dependent audio processing operations that alter (e.g., compress, cut, expand, boost, etc.) an input dynamic range of loudness levels in audio content into an output dynamic range that is different from the input dynamic range. DRC techniques as described herein can be used to provide a better listening experience in certain playback environments or situations. The DRC techniques may perform mapping of input loudness levels to output loudness levels based on DRC gains (e.g., scaling factors that scale audio amplitudes, boost ratios, cut ratios, etc.) looked up with a dynamic range compression curve (e.g., a lookup table, a curve, a multi-segment piecewise lines, etc.) that maps individual input loudness levels (e.g., of sounds other than dialogues, etc.) as determined from individual audio data frames to individual gains or gains for dynamic range control. Each of the individual gains indicates an amount of gain to be applied to a corresponding individual input loudness level. Output loudness levels after applying the individual gains represent target loudness levels for audio content in the individual audio data frames in a specific playback environment.

In addition to specifying mappings between gains and loudness levels, a dynamic range compression curve may include, or may be provided with, specific release times and attack times in applying specific gains. An attack refers to a boosting of loudness level, whereas a release refers to a cutting of loudness level. An attack time (e.g., 10 milliseconds, 20 milliseconds, etc.) refers to a time constant used in boosting a first (e.g., present, etc.) loudness level to a second higher (e.g., target, etc.) loudness level. A release time (e.g., 80 milliseconds, 100 milliseconds, etc.) refers to a time constant used in cutting a first (e.g., present, etc.) loudness level to a second lower (e.g., target, etc.) loudness level.

In some embodiments, the dynamic range controller (106) may determine a speaker configuration (e.g., flat panel mode, portable device with speakers, portable device with headphones, a 5.1 speaker configuration, a 7.1 speaker configuration, etc.) relating to the specific playback environment in which the object audio decoder (100) is operating, select one or more specific dynamic range compression curves—e.g., based on a profile determined for the specific playback environment in which the object audio decoder (100) is operating—from among available dynamic range compression curves, calculate one or more types of loudness levels as represented by the audio objects, etc. Zero, one or more of these loudness levels may be altered for the purpose of dynamic range control by the object audio decoder (100).

To determine the loudness levels, the object audio decoder (106) can determine one or more time-dependent physical sound wave properties such as spatial pressure levels at specific audio frequencies, etc., as represented by some or all of the audio objects, and use the one or more time-varying physical wave properties to derive one or more types of loudness levels based on one or more psychoacoustic functions modeling human loudness perception. A psychoacoustic function may be a non-linear function—as constructed based on a model of the human auditory system—that converts/maps specific spatial pressure levels at specific audio frequencies to specific loudness for the specific audio frequencies, etc.

A (e.g., broadband, wideband, etc.) loudness level over multiple (audio) frequencies or multiple frequency bands may be derived through integration of specific loudness level over the multiple (audio) frequencies or multiple frequency bands. Time-averaged loudness levels over one or more time intervals (e.g., longer than that represented by audio data elements in an audio data block or frame, etc.) may be obtained by using one or more smoothing filters that are implemented as a part of the audio processing operations in the object audio decoder (100).

In some embodiments, the type of loudness level may be an overall loudness level. The overall loudness level may refer to a broadband (wideband) loudness level in a single channel (e.g., center, etc.) of a speaker configuration. In some embodiments, an overall loudness level may refer to a broadband (or wideband) loudness level in a plurality of channels. The plurality of channels may include all channels in a speaker configuration. Additionally, optionally or alternatively, the plurality of channels may comprise a subset of channels (e.g., a subset of channels comprising left front, right front, and low frequency effect (LFE); a subset of channels comprising left surround and right surround; etc.) in a speaker configuration.

A (e.g., broadband, wideband, overall, specific, etc.) loudness level may be used as input to look up a corresponding (e.g., static, pre-smoothing, pre-limiting, etc.) DRC gain from the selected dynamic range compression curves. The loudness level to be used as input to look up the DRC gain may be first offset, adjusted or normalized with respect to a loudness level (e.g., "dialnorm", etc.) from program or signal features of an audio program or signal delivered in the encoded audio signal (102).

In some embodiments, the dynamic range controller (106) may be implemented with a DRC algorithm to generate gains (e.g., for dynamic range control, for gain smoothing, for normalizing operations, for cross-fading operations, for mixing concurrent programs, etc.), apply the gains to one or more loudness levels in the one or more types of loudness levels represented by the audio objects to achieve target loudness levels for the specific playback environment, etc.

Loudness levels used to determine (e.g., static, pre-smoothing, pre-gain limiting, etc.) DRC gains by looking up the selected dynamic range compression curves may be calculated on short intervals (e.g., approximately 5.3 milliseconds, etc.). The integration time of the human auditory system (e.g., approximately 200 milliseconds, etc.) may be much longer. The DRC gains obtained from the selected dynamic range compression curves may be smoothed with a time constant to take into account the long integration time of the human auditory system. To effectuate fast rates of changes (increases or decreases) in loudness levels, short time constants may be used to cause changes in loudness levels in short time intervals corresponding to the short time constants. Conversely, to effectuate slow rates of changes (increases or decreases) in loudness levels, long time constants may be used to changes in loudness levels in long time intervals corresponding to the long time constants.

The human auditory system may react to increasing loudness levels and decreasing loudness levels with different integration time. In some embodiments, different time constants may be used for smoothing the static DRC gains looked up from the selected dynamic range compression curves, depending on whether the loudness level will be increasing or decreasing. For example, in correspondence with the characteristics of the human auditory system, attacks (loudness level increasing) are smoothed with relatively short time constants (e.g., attack times, etc.), whereas releases (loudness level decreasing) are smoothed with relatively long time constants (e.g., release time, etc.).

A DRC gain for a portion (e.g., one or more of audio data blocks, audio data frames, etc.) of audio content may be calculated using a loudness level determined from the portion of audio content. The loudness level to be used for looking up in the selected dynamic range compression curves may be first adjusted with respect to (e.g., in relation to, etc.) a (e.g., dialogue, etc.) loudness level (e.g., in a program of which the audio content is a part, etc.) in the OAMD extracted from the encoded audio signal (102).

A reference loudness level (e.g., −31 $dB_{FS}$ in the "Line" mode, −20 $dB_{FS}$ in the "RF" mode, etc.) may be established for the specific playback environment at the object audio decoder (100). Additionally, alternatively or optionally, in some embodiments, users may be given control over setting or changing the reference loudness level at the object audio decoder (100).

The dynamic range controller (106) can determine a loudness related gain to the audio content to cause a change from the input loudness level to the reference loudness level as the output loudness level.

In some embodiments, the peak limiter (112) may operate in conjunction with the dynamic range controller (106) to handle peak levels in the specific playback environment at the object audio decoder (100) and generate peak limiting gains to prevent clipping.

In some operational scenarios, the audio content extracted from the encoded input audio signal (102) comprise audio objects for a reference multi-channel configuration with more channels than those of the specific audio channel configuration (or the specific speaker configuration) at the object audio decoder (100). Downmix equations (e.g., ITU stereo downmix, matrixed-surround compatible downmix, etc.) may be used by the object audio decoder (100) to downmix the audio objects for the reference configuration into the specific audio channel configuration and obtain the peak levels of the downmixed audio objects for the specific speaker configuration at the object audio decoder (100). Peak limiting gains preventing clipping (e.g., for an audio data block, for an audio data frame, etc.) may be determined based at least in part on an inverse (e.g., multiplied with −1 in the dB domain, etc.) of the peak levels.

In some operational scenarios, the audio content extracted by the object audio decoder (100) from the encoded input audio signal (102) comprise downmixed audio objects, which the upstream object audio encoder (150) has previously downmixed input audio objects represented in an input multi-channel configuration to a reference multi-channel configuration with fewer channels than those of the input audio channel configuration. Instead of performing gain limiting operations on the downmixed audio objects (or audio sample signals corresponding thereto), the upstream object audio encoder (150) can simply apply a simple attenuation operation with an attenuation gain (e.g., a constant attenuation gain, a per-channel attenuation gain, etc.) on the downmixed audio objects to be encoded into the encoded input signal (102) for the purpose of preventing overloading, and then include a corresponding normalization gain (e.g., an inverse of the attenuation gain, etc.) in the OAMD to be encoded with the downmixed audio objects in the encoded input signal (102). The normalization gain may be applied by the peak limiter (112) and/or the dynamic range controller (106) at the object audio decoder (100) to the downmixed audio objects to reverse the effects of, or cancel, the attenuation gain applied by the upstream object audio encoder (150) to the downmixed audio objects. Peak levels of the downmixed audio objects may be obtained for the specific speaker configuration at the object audio decoder (100). Peak limiting gains preventing clipping (e.g., for an audio data block, for an audio data frame, etc.) may be determined based at least in part on an inverse (e.g., multiplied with −1, etc.) of the peak levels.

In some embodiments, a combination of the adjustments to the loudness level and the DRC gain prevents clipping in the peak levels, possibly even in the worst-case downmix (e.g., producing the largest downmix channel gains, etc.). However, in some other embodiments, the combination of the adjustments to the loudness level and the DRC gain may still not be sufficient in preventing clipping in the peak level. In these embodiments, the peak limiting gains may be used by the peak limiter (112) and/or the dynamic range controller (106) to prevent clipping in connection with the peak levels.

The object audio renderer (108) can operate with the dynamic range controller (106) to use cross-fading gains included in the OAMD to generate cross-fading audio signals from two content types (e.g. movies or programs, etc.) that are to be played back consecutively. The cross-fading gains may be mapped from fading curves by the upstream object audio encoder (150). The fading curves may be linear or may be approximated by multiple linear segments with the precision to attain an expected level of audio quality. The fading curves or their approximation can be modeled or represented by the cross-fading gains in the OAMD in accordance with OAMD formats, syntax, and/or metadata carrying capabilities. The object audio renderer (108) can operate with the dynamic range controller (106) to do long-term (e.g., 10-60 seconds, movie-to-movie, etc.) cross-fading as well as short-term (e.g., 200 audio samples, several milliseconds, etc.) fade-out/fade-in in case of a sudden program switch (e.g. user switching channels by pressing a button on a remote control, etc.).

Additionally, optionally or alternatively, the object audio renderer (108) can operate with the dynamic range controller (106) to use audio object gains (in the OAMD) incorporating program mixing gains as gain components to generate mixed audio signals from two or more programs (e.g. mixing main and associated programs, etc.) that are to be played back concurrently. The program mixing gains may be transcoded from contribution levels of the programs by the upstream object audio encoder (150).

In some embodiments, the dynamic range controller (106) can obtain or retrieve time constants (e.g., attack times, release times, etc.) from the OAMD extracted from the encoded audio signal (102). The DRC gain, the time constants, the normalizing gains, the peak limiting gains, cross-fading gains, audio object mixing gains, etc., may be used by the dynamic range controller (106) to perform DRC, gain smoothing, gain limiting, cross-fading, program mixing, etc.

For example, the application of some or all of the gains may be smoothed with a filter controlled by time constants. A peak limiting operation (e.g., hard peak limiting, soft peak limiting, etc.) may be implemented by a min( ) function that takes the lower of a gain to be applied and a maximum allowed gain for the gain, through which the (e.g., pre-limiting, DRC, etc.) gain may be replaced immediately, over a relatively short time interval, etc., with the maximum allowed gain, thereby preventing clipping without introducing significant audible artifacts.

In some embodiments, the audio renderer (108) is configured to generate (e.g., multi-channel, etc.) channel-specific audio data (118) for the specific audio channel configuration after applying gains as determined based on DRC, peak limiting, cross-fading, program mixing, gain smoothing, etc., to the input audio data extracted from the encoded audio signal (102). The channel-specific audio data (118) may be used to drive speakers, headphones, etc., represented in the specific audio channel configuration with which the object audio decoder (100) is operating.

In some embodiments, the decoder (100) can be configured to perform one or more other operations relating to preprocessing, post-processing, rendering, etc., relating to the input audio data.

Techniques as described herein can be used with a variety of speaker configurations corresponding to a variety of different surround sound configurations (e.g., 2.0, 3.0, 4.0, 4.1, 4.1, 5.1, 6.1, 7.1, 7.2, 10.2, a 10-60 speaker configuration, a 60+ speaker configuration, etc.) and a variety of different rendering environment configurations (e.g., cinema, park, opera houses, concert halls, bars, homes, auditoriums, etc.).

3. UPSTREAM PROCESSOR PRIOR TO AUDIO RENDERING

Figure 1B:
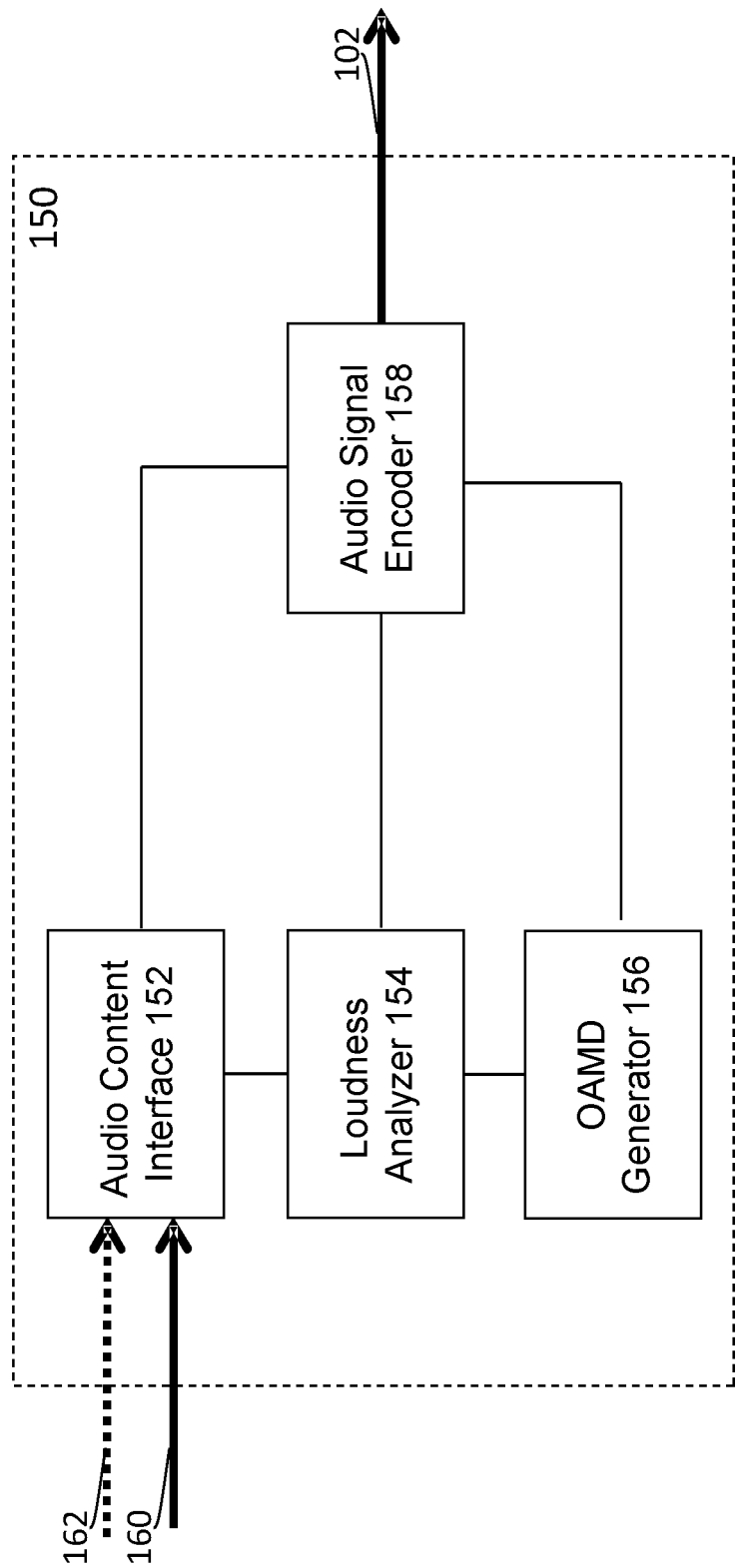
FIG. 1B illustrates an example object audio encoder or upstream audio processor.

FIG. 1B illustrates an example upstream audio processor such as an object audio encoder 150. The object audio encoder (150) may comprise an audio content interface 152, a loudness analyzer 154, an OAMD generator 156, an audio signal encoder 158, etc. The object audio encoder 150 may be a part of a broadcast system, an internet-based content server, an over-the-air network operator system, a movie production system, etc. Some or all of the components in the object audio encoder (150) may be implemented in hardware, software, a combination of hardware and software, etc.

In some operational scenarios, the audio content interface (152) receives input (or source) audio content 160, audio content control input 162, etc., from one or more content sources and/or systems. The input audio content (160) may constitute some or all of overall media data that comprises audio only, audiovisual, etc. The input audio content (160) may include input audio elements relating to one or more of a program, several programs, one or more commercials, movies, concurrent main and associate programs, consecutive programs, etc. Example input audio elements include but are not limited to: one or more audio objects, feeds, tracks, channel data, etc.

The audio content control input (162) may comprise some or all of user control input, control input provided by one or more systems/devices external to the object audio encoder (150), control input from one or more content creators, control input from one or more content providers, etc. For example, a user such as a mixing engineer, etc., can provide/specify one or more selected dynamic range compression curves for a given (e.g., each supported, etc.) playback environment in one or more supported playback environments in which recipient object audio decoders are expected to be operating. Zero, one, or more of the selected dynamic range compression curves may be standard-based, proprietary, customized, decoder-modifiable, etc.

In some embodiments, the loudness analyzer (154) determines or establishes one or more loudness levels of one or more portions (e.g., one or more input audio sample signals, one or more programs, one or more commercials, etc.) of the input audio content (160). In some embodiments, the input audio content (160) may comprise one or more sets of audio tracks, audio channel data, audio objects, etc. In some embodiments, dialogue audio content of the input audio content (160) is in separate audio tracks, audio channel data, audio objects, etc. In some embodiments, at least a portion of dialogue audio content of the input audio content (160) is in audio tracks, audio channel data, audio objects, etc., comprising non-dialogue audio content.

The object audio encoder (150) uses the input audio content (160), the audio content control input (162), etc., to derive output position-less audio sample signals for output audio objects and generate corresponding position related or non-position related metadata for the output audio objects.

In some operational scenarios, the input audio content (160) comprises input audio objects represented in an input multi-channel configuration with more channels than those of an output audio channel configuration in which the output audio objects are represented. Downmix equations (e.g., ITU stereo downmix, matrixed-surround compatible downmix, etc.) may be used by the object audio encoder (150) to downmix the input audio objects for the input configuration into the output audio objects for the output audio channel configuration and obtain the peak levels of the downmixed output audio objects for the output speaker configuration.

Instead of performing gain limiting operations on the downmixed audio objects (or audio sample data thereof), the object audio encoder (150) can simply apply a simple attenuation operation (e.g., a group multiplication operation instead of multiple multiplication operations with multiple different factors, etc.) with an attenuation gain (e.g., a constant attenuation gain, a per-channel attenuation gain, etc.) to audio sample data of the downmixed output audio objects for the purpose of preventing signal or loudness overloading. The object audio encoder (150) can include or merge—e.g., by way of the OAMD generator (156)—an inverse of the normalization gain as a gain component in each of audio object gains of the downmixed output audio objects. The attenuated audio sample data of the downmixed output audio objects may be encoded—along with the OAMD comprising the audio object gains that include but are not necessarily limited to only the inverse of the normalization gain—into the encoded input signal (102). The audio object gains may be applied by a recipient object audio decoder (100) of the encoded input signal (102) to the downmixed output audio objects decoded from the encoded input signal (102) to reverse the effects of, or cancel, the attenuation gain applied by the object audio encoder (150) to the downmixed output audio objects. Peak levels of the downmixed output audio objects after reversing the normalization gain may be obtained at the object audio decoder (100). Peak limiting operations preventing clipping (e.g., for an audio data block, for an audio data frame, etc.) may be applied by the recipient object audio decoder (100) in response to determining that any of the peak levels exceeds a preconfigured peak limiting threshold (e.g., the full digital scale, etc.).

In some operational scenarios, the object audio encoder (150) may support cross fading between two consecutive audio or audiovisual programs without modifying the position-less output audio sample signals or audio sample data of the two consecutive programs. The OAMD generator (156) can generate cross-fading gains and include the cross-fading gains as gain components in overall audio object gains of audio objects in the two consecutive programs. The overall audio object gains can be delivered as a part of the OAMD with the position-less output audio sample signals, without needing the object audio encoder (150) to actually apply the cross-fading gains to the position-less output audio sample signals or each sample thereof. The inclusion of the cross-fading gains in the overall audio object gains allows the object audio encoder (150) to aggregate cross fading into a group of operations deferred by the object audio encoder (150) and to cause recipient object audio decoder(s) to implicitly and/or automatically perform these deferred operations including cross fading at the audio rendering stage. The cross-fading gains to be included or merged into the overall audio object gains may be mapped from fading curves by the object audio encoder (150). The fading curves may be linear or may be approximated by multiple linear segments with the precision to attain an expected level of audio quality. The fading curves or their approximation can be modeled or represented by the cross-fading gains in the OAMD in accordance with OAMD formats, syntax, and/or metadata carrying capabilities. The OAMD generator (156) can generate cross fading gains that support long-term (e.g., 10-60 seconds, movie-to-movie, etc.) cross-fading as well as short-term (e.g., 200 audio samples, several milliseconds, etc.) fade-out/fade-in in case of a sudden program switch (e.g. user switching channels by pressing a button on a remote control, etc.).

In some operational scenarios, the object audio encoder (150) may support program mixing of two or more audio or audiovisual programs without modifying the position-less output audio sample signals or audio sample data of the two or more programs. The OAMD generator (156) can transcode contribution levels of the programs into program mixing gains of audio objects of the two or more programs and include or merge the program mixing gains to overall audio object gains of the audio objects in the OAMD, without needing the object audio encoder (150) to actually apply the contribution levels or the program mixing gains to the position-less output audio sample signals or each audio sample thereof. The inclusion of the program mixing gains in the overall audio object gains allows the object audio encoder (150) to aggregate program mixing into a group of operations deferred by the object audio encoder (150) and to cause recipient object audio decoder(s) to implicitly and/or automatically perform these deferred operations including program mixing at the audio rendering stage.

In some embodiments, the audio signal encoder (158) receives the position-less audio sample signals and the position related or non-position related metadata for the output audio objects, dialogue loudness levels (e.g., "dialnorm", etc.) for the position-less audio sample signals, selected dynamic range compression curves determined for one or more supported playback environments, reference loudness levels for various playback environments, overall audio object gains including but not limited to gain components such as inverses of normalization gains for deferred peak limiting operations, cross-fading gains for deferred cross-fading operations, program mixing gains for deferred program mixing operations, etc.

Some or all of the position-less audio sample signals for the output audio objects can be formatted by the audio signal encoder (158) into audio data blocks/frames. Some or all of the position related or non-position related metadata for the output audio objects, the loudness levels, the selected dynamic range compression curves, the reference loudness levels for various playback environments, the overall audio object gains including but not limited to the gain components such as the normalization gains, the cross-fading gains, the program mixing gains, etc., can be included in the OAMD and/or program or signal features to be multiplexed, encoded and/or compressed, along with the audio data blocks/frames, into an output encoded audio signal (e.g., 102, etc.), etc.

In some operational scenarios, time-varying peak levels for some or all of the output audio objects, as sampled at a particular time resolution (e.g., audio data block, several audio data blocks, an audio data frame, etc.), may be provided by the object audio encoder (150) to downstream recipient object audio decoders as a part of the OAMD in the encoded audio signal (102).

In some operational scenarios, time constants (e.g., attack times, release times, etc.) may be determined (e.g., through lookup operations of reference time constants accessible to the object audio encoder (150), etc.) and provided by the object audio encoder (150) to downstream recipient object audio decoders as a part of the OAMD in the encoded audio signal (102). These time constants may or may not vary with one or more of the dialogue loudness level or the current loudness level of some or all of the output audio objects.

An encoded audio signal as described herein can be a part of an overall media data bitstream (e.g., for an audio broadcast, an audio program, an audiovisual program, an audiovisual broadcast, etc.). The media data bitstream can be accessed from a server, a computer, a media storage device, a media database, a media file, etc. The media data bit stream may be broadcasted, transmitted or received through one or more wireless or wired network links. A media data bitstream may also be communicated through an intermediary such as one or more of network connections, USB connections, wide area networks, local area networks, wireless connections, optical connections, buses, crossbar connections, serial connections, etc.

Any of the components depicted (e.g., FIG. 1A, FIG. 1B, etc.) for the example upstream and downstream audio processors may be implemented as one or more processes and/or one or more IC circuits (e.g., ASICs, FPGAs, etc.), in hardware, software, or a combination of hardware and software.

In some operational scenarios, at least some audio processing operations can be performed by an audio processor as described herein in a loudness (e.g., perceptual, etc.) domain, rather than in the physical domain (or a digital domain representing the physical domain).

In some operational scenarios, gains from some or all of a variety of processing such as DRC, equalization, noise compensation, audio object gains including but not limited to gain components for peak limiting, cross fading, program mixing, clip prevention, gain smoothing, etc., may be combined in the same gains (e.g., in the loudness domain, in the digital domain, etc.) and/or may be applied in parallel, in series, part in parallel part in series, etc. In some operational scenarios, gains from some or all of a variety of processing such as DRC, equalization, noise compensation, peak limiting, cross fading, program mixing, clip prevention, gain smoothing, etc., may be applied in order.

One or more audio processing elements, units, components, etc., such as transmission filters, auditory filterbank, synthesis filterbank, short-time-Fourier transform, etc., may be used by an encoder or decoder to perform audio processing operations as described herein.

4. PEAK LIMITING

By way of example but not limitation, an upstream audio processor such as an object audio encoder (e.g., 150 of FIG. 1B, etc.) may downmix input audio content represented in a first multi-channel speaker configuration to generate downmixed audio content represented a second multi-channel speaker configuration that has fewer audio channels or speakers than the first multi-channel speaker configuration. For example, parametric coding tools (e.g., Advanced Joint Object Coding in a Dolby AC-4 encoder, etc.) may be used to reduce the (original) total number of input channels of the input audio content by downmixing. In some operational scenarios (in which a multi-channel audio channel or speaker configuration in a playback environment supports the original total number of channels), the original number of channels can be restored by an object audio decoder from the downmixed audio content using (e.g., upmixing metadata corresponding to, etc.) downmixing metadata (e.g., downmixing equations or matrices used in downmixing, upmixing equations or matrices corresponding to the downmixing equations or matrices, etc.) included in the OAMD received by the object audio decoder.

Loudness levels in the downmixed audio content may exceed a peak limit (or a preconfigured peak limit threshold), which commonly would cause encoders to perform peak limiting operations on audio sample data in the downmixed audio content under other approaches that do not implement techniques as described herein. Under these other approaches, when the number of input audio sample signals in the input audio content is reduced by downmixing, a peak limiter may be used or invoked at the encoder side to preserve or maintain signal levels (of downmixed audio sample signals in the downmixed audio content) below the peak limit (e.g., an absolute threshold, the digital full scale, etc.) to ensure that each signal level of the downmixed audio sample signals in the downmixed audio content is (e.g., inherently, determined based on the audio sample data in the signal, etc.) below an applicable peak limit.

Peak limiting operations may be implemented based on hard limiting (e.g., using a min( ) function that selects the lesser of the peak limit or a loudness level, etc.) that may generate significant audible artifacts impacting audio quality.

Additionally, optionally or alternatively, peak limiting operations may be implemented based on soft limiting that do not generate the audible artifacts as hard limiting does. Soft limiting starts applying limiting prior to reaching the absolute threshold (or the peak limit) in order to provide a smoother, more audibly pleasing result. Soft limiters may also use a "look ahead" feature to predict when future clipping may occur in order to smoothly reduce the gain prior to when clipping would occur and thus avoid clipping. Peak limiting (e.g., typically, etc.) increases system latency (or processing delay).

Instead of applying peak limiting (e.g., delay or system-latency-causing complicated soft limiting operations, artifact-causing hard limiting operations, etc.) at the encoder side, the object audio encoder as described herein can simply apply a normalization gain to the downmixed audio content to generate attenuated audio content, include an inverse of the normalization gain in overall audio objects in the affected audio objects, and include the overall audio object gains in the OAMD of the coded bitstream with the attenuated audio content, in lieu of performing the peak limiting operations at the encoder side. In some operational scenarios, the object audio encoder does not (need to) comprise or implement a peak limiter or peak limiting functionality, other than using OAMD or audio object gains therein to defer and aggregate peak limiting operations to cause downstream object audio decoders to perform these deferred operations.

The normalization gain (e.g., 70%, 50%, etc.) may be selected based on a downmixing equation or matrix used to downmix the input audio content to the downmixed audio content. For example, in some operational scenarios, a maximum possible boost (to loudness levels) from the downmixing equation or matrix can be determined. The normalization gain may be selected to be specifically counteract or cancel the maximum possible boost in loudness levels of the downmixed audio content, regardless of whether such boost actually causes the loudness levels of the downmixed audio content to exceed the peak limit (e.g., the absolute threshold, the full digital scale for loudness or volume, etc.). Additionally, optionally or alternatively, the normalization gain may be selected for preventing signal level overloading (e.g., loudness level overloading, etc.), so long as the encoder's application of the normalization gain to the downmixed audio content to generate the attenuated audio content is reversible by a recipient decoder with an application of the inverse of the normalization gain to the attenuated audio content to reproduce (e.g., faithfully, approximately, with a precision tolerance, etc.) the downmixed audio content.

In some operational scenarios, the normalization gain may be a constant (e.g., uniform, etc.) gain across all channels or comprise multiple per-channel constant gains for multiple channels. Additionally, optionally or alternatively, the normalization gain may be independent of, or invariant with, any hard limiting (e.g., using the min( ) function, etc.) or soft limiting (e.g., using a complex look ahead and smoothened gains, etc.).

The object audio decoder can implicitly and/or automatically apply the inverse of the normalization gain as a gain component in the overall audio object gains to the attenuated audio content received with the OAMD to reproduce the downmixed audio content that may comprise loudness levels exceeding a peak level applicable in a specific audio channel or speaker configuration of the object audio decoder, and apply peak limiting operations (e.g., hard limiting, soft limiting, etc.) as necessary (e.g., to prevent overloading to the speakers, when a specific audio content portion contains a loudness level exceeding the peak limit, etc.) to the reproduced downmixed audio content as a part of object audio rendering operations performed by the object audio decoder for the specific audio channel or speaker configuration.

Limiting operations (e.g., hard limiting, soft limiting, etc.) as performed by an upstream audio processor would typically have introduced irreversible change on audio sample data. A downstream audio processor such as an object audio decoder (e.g., 100 of FIG. 1A, etc.) receiving the audio sample data applied with the limiting operations would typically have been unable to reproduce the audio sample data before the limiting operations. Thus, the downstream audio processor would have been unable to fully and/or faithfully restore the received audio sample content to the audio sample content prior to the limiting operations even if the downstream audio processor operates with an actual audio channel or speaker configuration (or setup) that could have been able to reproduce the loudness levels in the audio sample content prior to the limiting operations.

In contrast, under techniques as described herein, an application of a normalization gain by an upstream audio processor is fully reversible. For example, in some operational scenarios, the object audio decoder (100) may receive the attenuated downmixed audio content and (e.g., fully, faithfully, reversibly, etc.) reproduce the pre-attenuated downmixed audio content by applying the inverse of the normalization gain implicitly and/or automatically. As a result, if such object audio decoder operating with an actual audio channel or speaker configuration (or setup) is able to reproduce the loudness levels in the audio sample content prior to the limiting operations, then such audio content and/or such loudness levels, prior to the limiting operations, can be properly and fully reproduced in the actual audio channel or speaker configuration (or setup).

In some operational scenarios, the normalization gain may be sent as a program or signal feature, for example with a "dialnorm" value which represents the measured loudness of an audio sample signal (for an audio channel). However, the "dialnorm" value may be exposed externally as a signal property; overloading or changing such value may have unexpected side effects. Lowering the "dialnorm" value (or an equivalent measured loudness) may cause the object audio decoder to compensate for the lowered loudness level corresponding to the lowered "dialnorm" value. Operations depending on the "dialnorm" value may be affected. For example, a DRC comparator used in DRC lookup operations may use the lowered "dialnorm" value as an offset and obtain DRC gains that may be over-compressed or over-expanded than otherwise.

Using normalization gains as described herein allows different normalization gains (or their corresponding inverses) to be applied to different audio objects, as compared with using a single gain (e.g., "dialnorm", etc.). Potential applications of this approach can be extended from merely supporting downmixing/upmixing between different audio channel or speaker configurations to supporting partial mixing or object specific processing (e.g., subsets of channels, subsets of audio objects, etc.). For example, a proper subset of audio objects in a set of all the (total number of) audio objects represented in input audio content may be mixed, whereas the remainder audio objects in the set are not affected by such partial mixing operation.

Figure 2A:
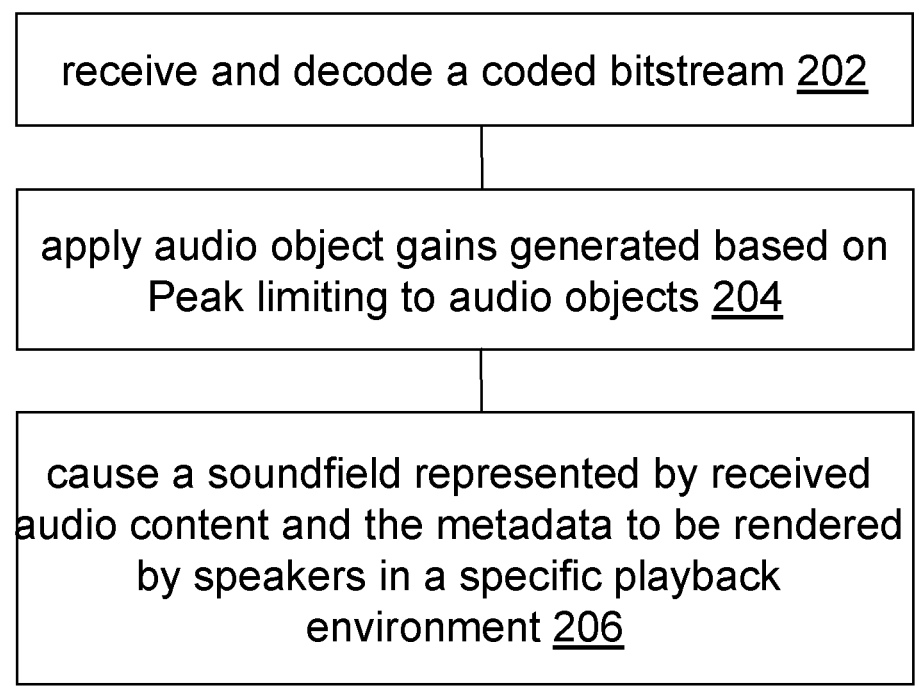
FIG. 2A and FIG. 2B illustrate example process flows for deferred peak limiting operations.
Figure 2B:
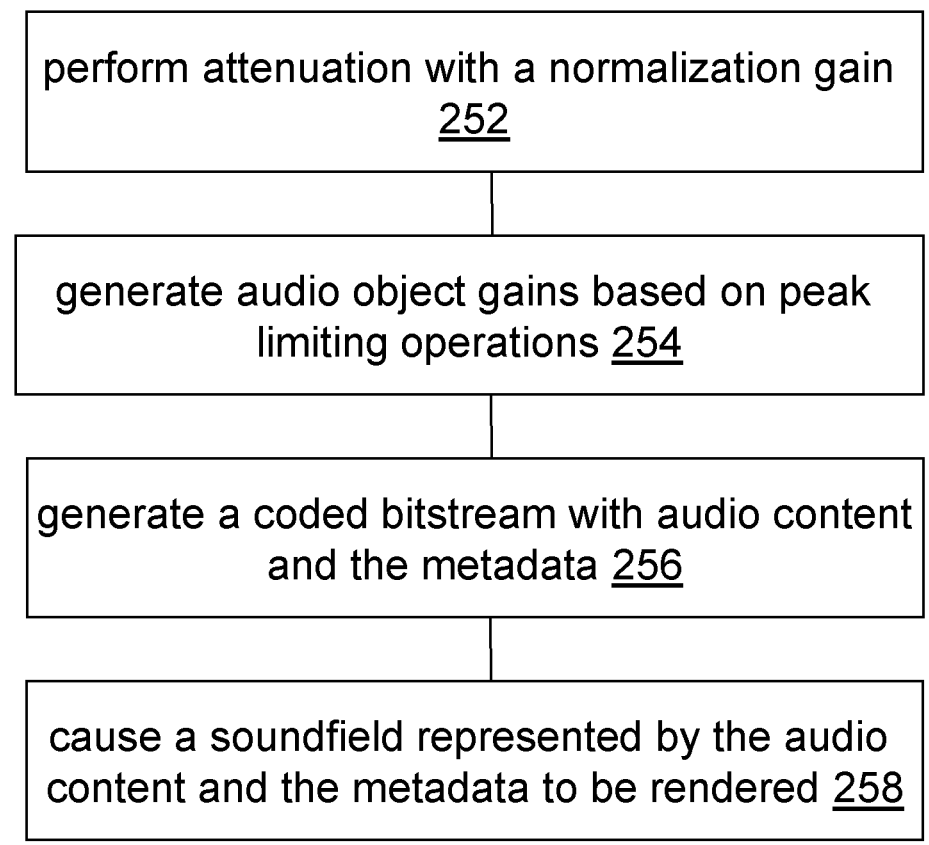

FIG. 2A and FIG. 2B illustrate example process flows for deferred peak limiting operations. In some embodiments, one or more computing devices or units in a media processing system may perform either of the process flows.

FIG. 2A illustrates an example process flow that may be implemented by an object audio decoder as described herein. In block 202 of FIG. 2A, a downstream audio processor such as an object audio decoder (e.g., 100 of FIG. 1A, etc.) receives and decodes a coded bitstream generated by an upstream audio processor. The coded bitstream is encoded with position-less audio content and audio metadata corresponding to the position-less audio content.

The position-less audio content includes a set of attenuated audio sample signals; the set of attenuated audio sample signals is derived by the object audio encoder performing an attenuation with a normalization gain on a set of pre-attenuated audio sample signals.

The audio metadata includes audio object gains generated based at least in part on the inverse of the normalization gain.

The attenuation performed by and the audio object gains generated by the upstream audio processor free the upstream audio processor from performing peak limiting operations on the set of pre-attenuated audio sample signals.

In block 204 of FIG. 2A, the upstream audio processor applies the audio object gains to the set of attenuated audio sample signals.

In block 206 of FIG. 2A, the upstream audio processor causes a soundfield represented by the position-less audio content and the audio metadata to be rendered by a set of speakers operating with the audio renderer in a specific playback environment.

In an embodiment, the normalization gain is a constant attenuation gain applied by the audio processor with the audio renderer to the set of pre-attenuated audio sample signals.

In an embodiment, the audio metadata includes an audio metadata portion that specifies positions of a set of audio objects represented in the decoded audio content.

In an embodiment, the set of attenuated audio sample signals represents a set of audio objects with time-varying spatial positions.

In an embodiment, the set of attenuated audio sample signals represents a set of audio channels of a specific audio channel configuration.

In an embodiment, the set of pre-attenuated audio sample signals represents a set of pre-attenuated downmixed audio sample signals.

FIG. 2B illustrates an example process flow that may be implemented by an object audio encoder as described herein. In block 252 of FIG. 2B, an upstream audio processor such as an object audio encoder (e.g., 150 of FIG. 1B, etc.) performs attenuation with a normalization gain on a set of pre-attenuated audio sample signals to generate a set of attenuated audio sample signals.

In block 254 of FIG. 2B, the downstream audio processor generates audio object gains based at least in part on an inverse of the normalization gain.

The attenuation performed by and the audio object gains generated by the audio processor free the audio processor from performing peak limiting operations on the set of pre-attenuated audio sample signals.

In block 256 of FIG. 2B, the downstream audio processor generates a coded bitstream encoded with position-less audio content and audio metadata corresponding to the position-less audio content.

The position-less audio content includes the set of attenuated audio sample signals; wherein the audio metadata includes the audio object gains.

In block 258 of FIG. 2B, the downstream audio processor causes a soundfield represented by the position-less audio content and the audio metadata to be rendered by a set of speakers in a specific playback environment.

In an embodiment, the set of pre-attenuated audio sample signals represents a set of audio objects with time-varying spatial positions.

In an embodiment, the set of pre-attenuated audio sample signals represents a set of audio channels of a specific audio channel configuration.

In an embodiment, the set of pre-attenuated audio sample signals represents position-less pre-attenuated audio sample data, wherein the set of attenuated audio sample signals represents position-less attenuated audio sample data.

5. CROSS FADING

Similar to peak limiting, cross fading operations may also be deferred by encoders to be performed by decoders as part of object audio rendering operations.

In signal processing chains that do not implement techniques as described herein, cross fading audio signals between two consecutive content types (e.g., movies, programs, etc.) may be realized by an encoder multiplying audio essence (or audio sample data) with monotonically decreasing/increasing gain curves. Such signal modification operations incur a non-negligible amount of computational complexity, as these operations operate on, or take place with, each audio sample (e.g., PCM sample, non-PCM sample, etc.) with different multiplications and/or different multiplicative factors. For a 48 k/sec sampling rate, approximately 48,000 such operations may need to be performed per second.

Under techniques as described herein, instead of performing cross fading modifications on audio sample data at the encoder side, the object audio encoder (or the upstream audio processor therein) as described herein can generate cross fading gains based on cross fading curves and include or merge the cross fading gains as part of audio object gains to be carried in the OAMD of the coded bitstream with (pre-cross-faded) audio content, in lieu of performing the cross fading operations at the encoder (upstream audio processor) side. In some operational scenarios, the object audio encoder does not comprise or implement a cross fader or cross fading functionality, other than generating cross fading gain values and using OAMD to indicate audio object gains with the cross fading gain values as gain components to defer and aggregate the cross fading operations to cause downstream object audio decoders (or downstream audio rendering stage) to perform these deferred operations instead.

The cross fading gains included in the audio object gains may be derived from fading curves that are linear or that can be approximated by linear segments (e.g., as interpolated by the decoder with two adjacent gain values, i.e. two consecutive audio object gains in time, etc.) with a precision to attain an expected or corresponding level of audio quality. The fading curves or their approximation can be modeled within restrictions or capabilities of a supported OAMD format or specification. For example, a minimum of a certain number of (e.g., fewer than 16, 32, 200, 256, more than 256, etc.) audio samples, digitally representing the audio content, may be needed between metadata updates that carry adjacent cross fading gains as part of audio object gains in a coded bitstream as described herein. Metadata updates are anchored to a particular audio sample in which the update takes effect. Additionally, optionally or alternatively, a maximum of eight updates per OAMD payload, e.g. per frame, may be used to carry cross fading gains as part of audio object gains in the coded bitstream. A look-ahead buffer may be used to cache samples. Different metadata specifications and/or standards with different metadata carriage capabilities and update frequencies may be used or supported in various embodiments.

Different types of fading operations may be implemented in the object audio decoder. For example, an object audio renderer (downstream audio rendering stage) may be implemented in the object audio decoder to support long term (e.g., approximately 10 to 60 seconds, etc.), e.g. movie-to-movie, cross fading. Non-linear transition curves may be performed by linear or other segments supported within an applicable OAMD format or specification.

Additionally, optionally or alternatively, the object audio renderer (e.g. the downstream audio rendering stage) or the object audio decoder implicitly and/or automatically supports short term (e.g., approximately a time interval of 200 audio samples, etc.) fade-out/fade-in. Short term cross fading may be used for sudden program switching (e.g. user switching channels by pressing a button on the remote control, etc.) by way of applying audio object gains that include cross fading gains. For the fade-out, a relatively short time frame may be implemented for the fading process. Long term and short term cross fading may be based in part on certain update rates (e.g. every 256 samples, etc.) supported by an applicable OAMD format or specification (e.g., Dolby TrueHD, etc.). Additionally, optionally or alternatively, additional look-ahead may be implemented to start the fade-out operation at the right point in time.

Figure 3A:
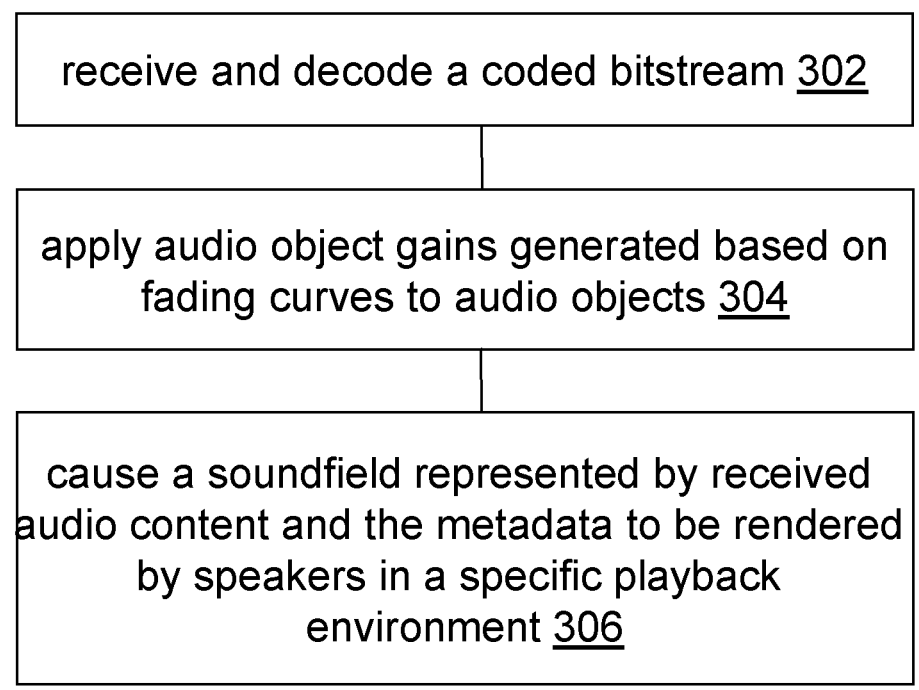
FIG. 3A and FIG. 3B illustrate example process flows for deferred cross fading operations.
Figure 3B:
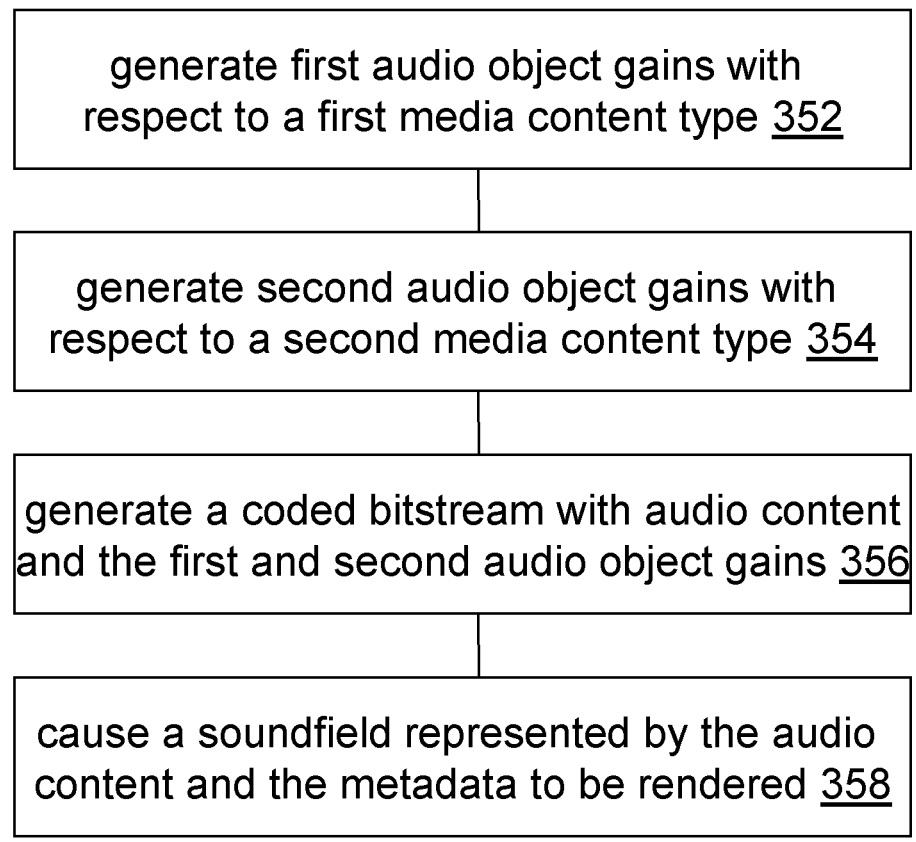

FIG. 3A and FIG. 3B illustrate example process flows for deferred cross fading operations. In some embodiments, one or more computing devices or units in a media processing system may perform either of the process flows.

FIG. 3A illustrates an example process flow that may be implemented by an object audio decoder or a downstream audio rendering stage in an end-to-end audio processing chain as described herein. In block 302 of FIG. 3A, a downstream audio processor such as an object audio decoder or downstream audio rendering stage (e.g., 100 of FIG. 1A, etc.) receives and decodes a coded bitstream generated by an object audio encoder. The coded bitstream is encoded with audio content and audio metadata corresponding to the audio content. The audio content may 'position-less' as explained the audio content itself does not carry information about the position of the audio but it is rather the corresponding metadata that carry position information of the audio content.

The audio content includes first audio objects corresponding to a first media content type of two consecutive media content types and second audio objects corresponding to a second media content type of the two consecutive media content types.

The audio metadata includes first and second audio object gains, respectively for the first and second audio objects, generated at least in part based on a first fading curve of the first media content type and a second fading curve of the second media content type, respectively.

The first and second audio object gains generated by the upstream audio processor free the upstream audio processor from performing cross-fading operations on the first audio objects of the first media content type and the second audio objects of the second media content type.

In block 304 of FIG. 3A, the downstream audio processor or downstream rendering stage applies the first and second audio object gains generated at least in part based on the first and second fading curves to the first and second audio objects, respectively.

In block 306 of FIG. 3A, the downstream audio processor renders a sound field represented by the first audio objects with the applied first audio object gains and second audio objects with the applied second audio object gains. For example, the downstream audio processor or downstream audio rendering stage may cause the sound field to be rendered by a set of speakers operating with the object audio decoder in a specific playback environment.

In an embodiment, cross fading gain components in the audio object gains approximate the first and second fading curves.

In an embodiment, the first fading curve and the second fading curve are linear.

In an embodiment, the first fading curve and the second fading curve are determined by interpolating at least two consecutive first audio object gains and two consecutive second audio object gains, respectively.

In an embodiment, a minimum number of audio samples representing the audio content is used between metadata updates, wherein the metadata updates are associated to a particular audio sample.

In an embodiment, the metadata updates are a maximum of eight per frame.

In an embodiment, the downstream audio rendering stage supports long term and/or short-term, e.g. movie-to-movie, cross fading.

In an embodiment, the first and second object gains are generated at least in part based on selected dynamic range compression curves. The first and second object gains may be applied to one or more loudness levels in the one or more types (e.g., wideband, broadband or overall) of loudness levels represented by the first audio objects and the second audio objects to achieve a target loudness levels for a specific playback environment. By having the first and second object gains generated in part based on cross fading curves and in part based on selected dynamic range compression curves, it is possible to aggregate both cross fading aspects and DRC aspects in a single gain component, thereby providing more control of the rendered/played back sound field.

In an embodiment, the selected dynamic range compression curves are smoothed with a time constant.

FIG. 3B illustrates an example process flow that may be implemented by an object audio encoder as described herein. In block 352 of FIG. 3B, an upstream audio processor such as an object audio encoder (e.g., 150 of FIG. 1B, etc.) generates first audio object gains, for first audio objects of a first media content type of two consecutive media content types, based at least in part on a first fading curve for the first media content type.

In block 354 of FIG. 3B, the upstream audio processor generates second audio object gains, for second audio objects of a second media content type of the two consecutive media content types, based at least in part on a second fading curve for the second media content type.

In block 356 of FIG. 3B, the upstream audio processor generates a coded bitstream encoded with audio content and audio metadata corresponding to the audio content. The audio content may be defined as 'position-less', as explained above, i.e. the audio content itself does not carry information about the position of the audio but it is rather the corresponding metadata that carry position information of the audio content.

The audio content includes the first and second audio objects.

The audio metadata includes the first and second audio object gains. The encoded bitstream is sent to a downstream audio rendering stage in an end-to-end audio processing chain.

The first and second audio object gains generated by the upstream audio processor free the upstream audio processor from performing cross-fading operations on the first audio objects of the first media content type and the second audio objects of the second media content type.

In block 358 of FIG. 3B, the upstream audio processor causes a soundfield represented by the audio content and the audio metadata to be rendered by the downstream audio rendering stage or to a set of speakers operating with the downstream rendering stage in a specific playback environment.

6. PROGRAM MIXING

Similar to peak limiting and cross fading as previously discussed, other operations including but not limited to program mixing operations may also be deferred by encoders to be performed by decoders as part of object audio rendering operations.

Program mixing gains generated for the deferred operations may be included as part of audio object gains by an upstream audio processor such as an object audio encoder (e.g., 150 of FIG. 1B, etc.) in OAMD sent with audio sample data to a downstream recipient audio processor such as an object audio decoder (e.g., 100 of FIG. 1A, etc.).

In signal processing chains that do not implement techniques as described herein, mixing two or more concurrent programs (e.g., main program(s), associated program(s), etc.) may be realized by an encoder modifying audio essence (or audio sample data) in accordance with (e.g., main/ associate, etc.) mixing levels that indicate contributions of the two or more concurrent programs, respectively, to the final output. Such signal modification operations incur a non-negligible amount of computational complexity.

Under techniques as described herein, instead of performing program mixing modifications on audio sample data at the encoder side, the object audio encoder as described herein can generate program mixing gains by transcoding mixing levels of audio programs into part of individual audio object gains, in lieu of performing the program mixing operations at the encoder side. In some operational scenarios, the object audio encoder does not comprise or implement a program mixer or program mixing functionality, other than generating program mixing gain values and using OAMD with the program mixing gain values as part of the audio object gains to defer and aggregate the program mixing operations to cause downstream object audio decoders to perform these deferred operations instead.

By transcoding the gains or mixing levels of the programs (e.g., main and associate audio programs, etc.) into program mixing gains to be included or merged in audio object gains, the program mixing step is moved from the encoder side into a rendering stage implemented at the decoder side. Thus, no additional mixing step need to be performed by the object audio encoder.

Figure 4A:
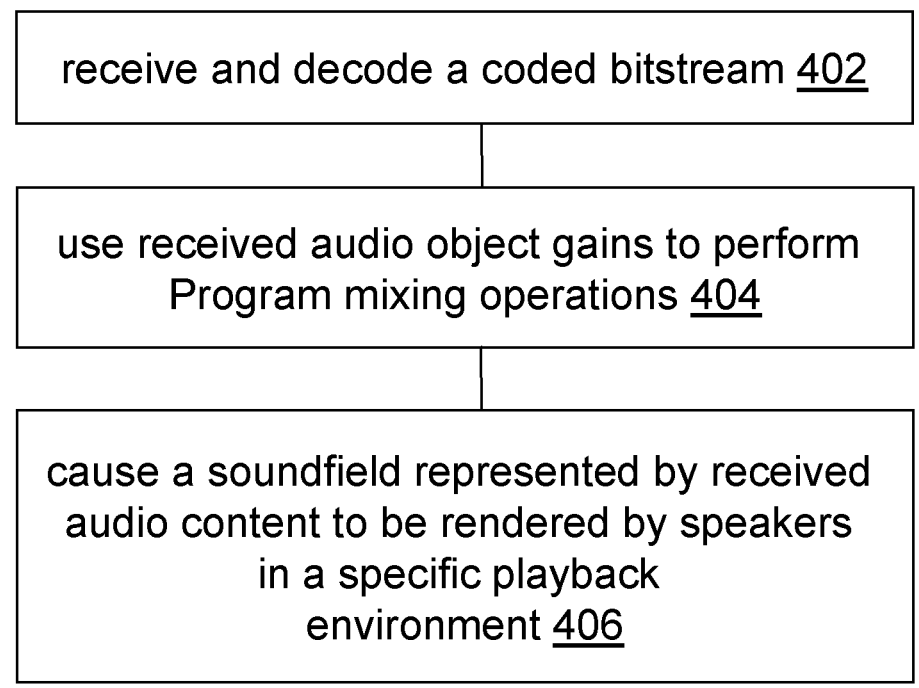
FIG. 4A and FIG. 4B illustrate example process flows for deferred program mixing operations.
Figure 4B:
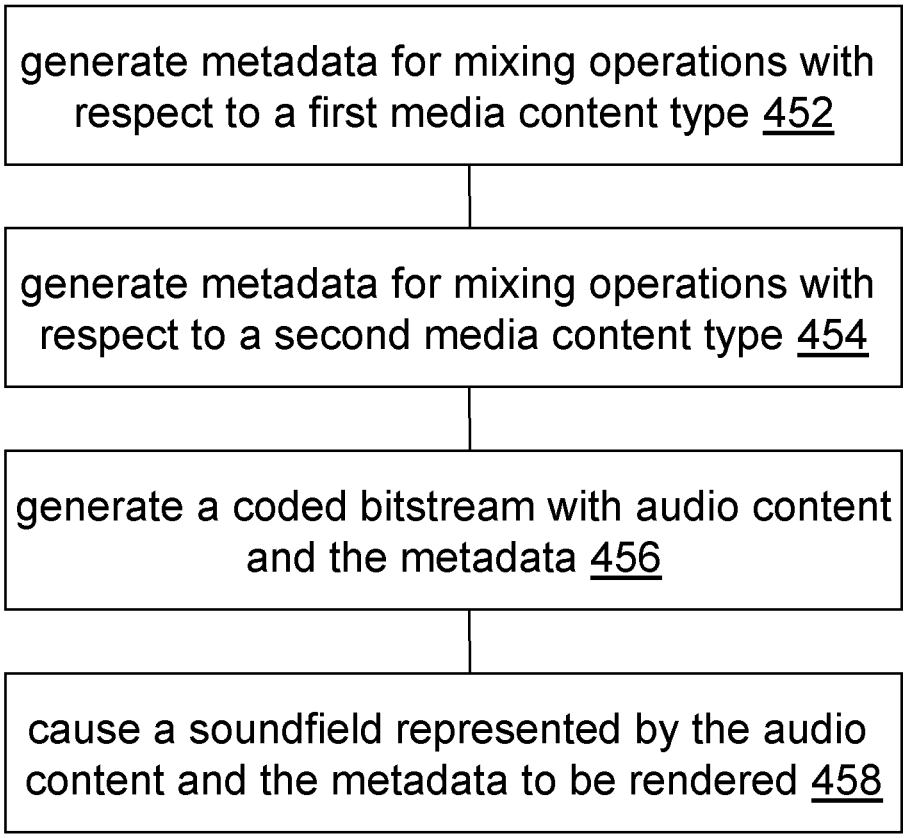

FIG. 4A and FIG. 4B illustrate example process flows for deferred program mixing operations. In some embodiments, one or more computing devices or units in a media processing system may perform either of the process flows.

FIG. 4A illustrates an example process flow that may be implemented by an object audio decoder as described herein. In block 402 of FIG. 4A, a downstream audio processor such as an object audio decoder (e.g., 100 of FIG. 1A, etc.) receives and decodes a coded bitstream generated by an upstream audio processor. The coded bitstream is encoded with position-less audio content and audio metadata corresponding to the position-less audio content.

The position-less audio content includes first audio objects corresponding to a first audio program of two or more concurrent audio programs and second audio objects corresponding to a second audio program of the two or more concurrent audio programs.

The audio metadata includes first and second audio object gains, respectively for the first and second audio objects, generated at least in part based on a first program mixing level of the first audio program and a second program mixing level of the second audio program, respectively.

The first and second audio object gains generated by the upstream audio processor free the upstream audio processor from performing program mixing operations on the first audio objects of the first audio program and the second audio objects of the second audio program.

In block 404 of FIG. 4A, the upstream audio processor applies the first and second audio object gains generated at least in part based on the first and second program mixing levels to the first and second audio objects, respectively.

In block 406 of FIG. 4A, the upstream audio processor causes a sound field at least in part represented by the first and second audio objects to be rendered by a set of speakers in a specific playback environment.

In an embodiment, the first audio program represents at least a part of a main program, wherein the second audio program represents at least a part of an associated program.

FIG. 4B illustrates an example process flow that may be implemented by an object audio encoder as described herein. In block 452 of FIG. 4B, an upstream audio processor such as an object audio encoder (e.g., 150 of FIG. 1B, etc.) generates first audio object gains, for first audio objects of a first audio program of two or more concurrent audio programs, based at least in part on a first program mixing level of the first audio program.

In block 454 of FIG. 4B, the upstream audio processor generates second audio object gains, for second audio objects of a second audio program of the two or more concurrent audio programs, based at least in part on a second program mixing level of the second audio program.

The first and second audio object gains generated by the audio processor free the audio processor from performing program mixing operations on the first audio objects of the first audio program and the second audio objects of the second audio program.

In block 456 of FIG. 4B, the upstream audio processor generates a coded bitstream encoded with position-less audio content and audio metadata corresponding to the position-less audio content.

The position-less audio content includes the first and second audio objects.

The audio metadata includes the first and second audio object gains.

In block 458 of FIG. 4B, the upstream audio processor causes a soundfield represented by the position-less audio content and the audio metadata to be rendered by a set of speakers in a specific playback environment.

An object audio decoder may implement an audio object renderer to perform some or all of (e.g., normal, already available, existing, etc.) audio rendering operations. On top of, or in addition to, these (e.g., normal, already available, existing, etc.) normal rendering operations, the object audio decoder or the audio object renderer therein (e.g., implicitly, automatically, etc.) performs deferred signal processing operations by way of applying audio object gains to generate output audio samples to drive speakers or audio transduction devices. For example, audio object gains incorporating inverses of normalization gains, gains approximating cross fading curves, gains derived from mixing/contribution levels of programs, etc., can be set in audio objects. As the audio object gains are specified in these audio objects, in response to receiving the audio object gains, the object audio decoder or the audio object renderer therein implicitly and/or automatically apply the specified audio object gains to the audio sample data relating to the audio objects without needing to separately implement limiting operations, cross fading operations, program mixing operations, etc., in an end-to-end signal processing chain including upstream audio processors or downstream audio processors.

In other words, given an audio object gain, regardless of whether or not it is (e.g., in part, in whole, etc.) derived from normalization gains, gains approximating cross fading curves, mapped gains transcoded from mixing/contribution levels, the audio object renderer or the rendering stage implemented in the signal processing chain is already capable of implicitly and/or automatically applying such audio object gain to received audio sample data of the audio object to generate output audio samples (without needing to implement any additional functionality in the object audio renderer or the rendering stage).

For example, if a normalization gain was applied before the audio rendering stage with a value of 0.5, then an inverse of the normalization gain, 2.0, can be incorporated into an audio object gain and applied implicitly and/or automatically by an audio rendering stage as described herein. Similarly, approximating gains (or audio object gain components) for cross fading and program mixing gains (or audio object gain components) for program mixing can be specified or incorporated into overall audio object gains, which can be applied implicitly and/or automatically by an audio rendering stage as described herein.

It should be noted that, in various embodiments, any in a variety of different (e.g., OAMD-based, non-OAMD-based, etc.) metadata vehicles or approaches may be used to aggregate or defer signal processing operations (e.g., limiting, fading, mixing, etc.) from a media encoder (e.g., a video encoder, an audio encoder, an audiovisual encoder, an upstream codec, an upstream encoder, an upstream transcoder, an upstream decoder, etc.) to a media decoder implementing a rendering stage of audio and/or audiovisual sample data (e.g., in the PCM domain, in the non-PCM domain, etc.).

Additionally, optionally or alternatively, some or all deferred operations may or may not be related to (e.g., time varying, etc.) positions of audio objects. Metadata (e.g., in OAMD, etc.) also may or may not be related to (e.g., time varying, etc.) positions of audio objects. In some operational scenarios, some or all of the encoder-deferred operations and/or corresponding encoder-generated metadata are independent of any positions of audio objects.

Identifying operations to be deferred and/or generating metadata to aggregate the operations for a downstream audio processor implementing an audio rendering stage to perform may be done by an upstream audio processor prior to the audio rendering stage automatically, manually, with no or little user input, with user input, etc. In some operational scenarios, an artist or a system designer may be involved in identifying operations to be deferred and/or generating metadata (e.g., how frequent and/or how accurate cross fading gains should be generated and sent via OAMD, etc.).

In an embodiment, a non-transitory computer readable storage medium, comprising software instructions, which when executed by one or more processors cause performance of any one of the methods as described herein. Note that, although separate embodiments are discussed herein, any combination of embodiments and/or partial embodiments discussed herein may be combined to form further embodiments.

7. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
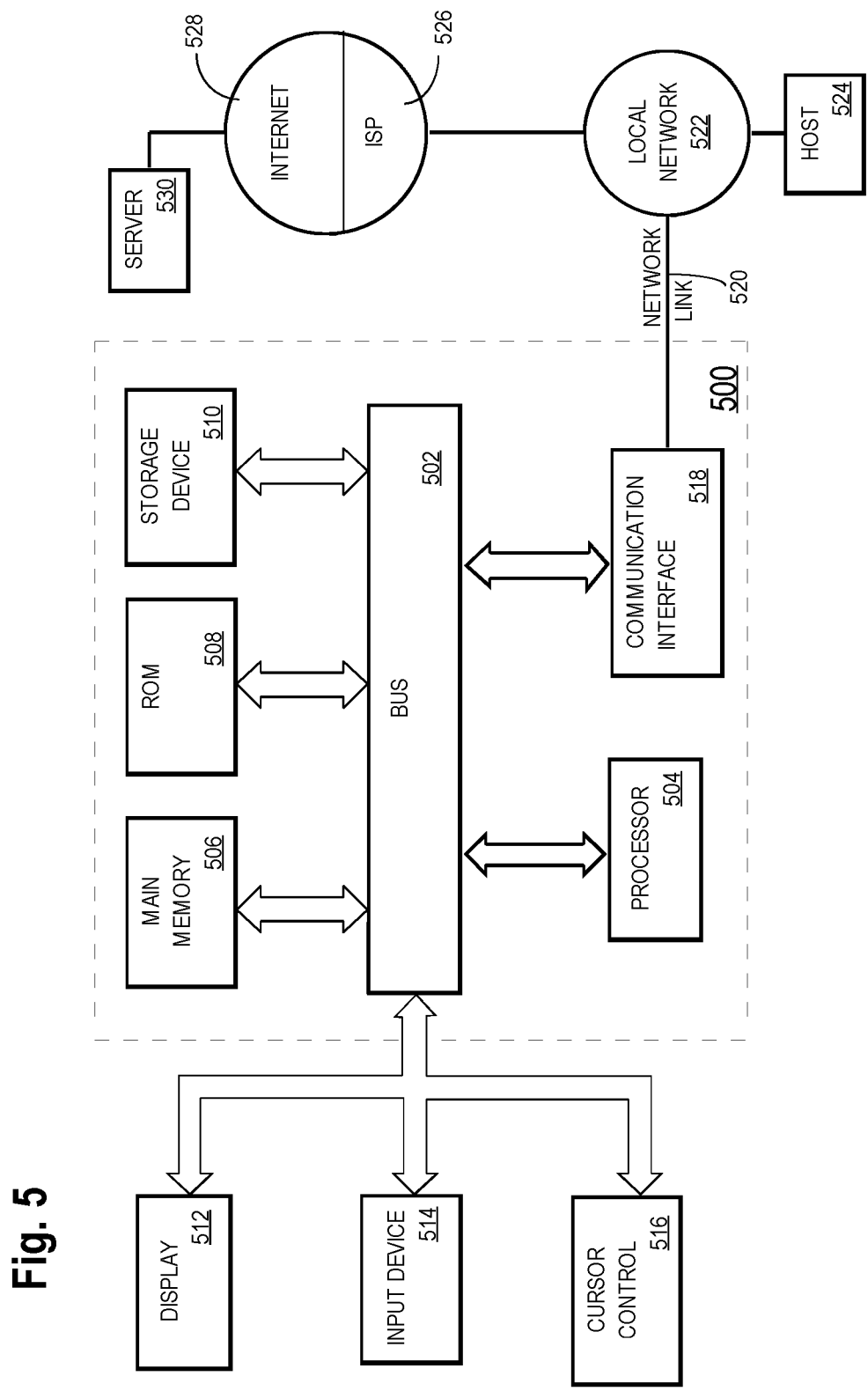
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEE1. A method performed by an audio processor with an audio renderer, comprising:

receiving and decoding a coded bitstream generated by an upstream audio processor, wherein the coded bitstream is encoded with position-less audio content and audio metadata corresponding to the position-less audio content;

wherein the position-less audio content includes a set of attenuated audio sample signals; wherein the set of attenuated audio sample signals is derived by the object audio encoder performing an attenuation with a normalization gain on a set of pre-attenuated audio sample signals;

wherein the audio metadata includes audio object gains generated based at least in part on the inverse of the normalization gain;

wherein the attenuation performed by and the audio object gains generated by the upstream audio processor free the upstream audio processor from performing peak limiting operations on the set of pre-attenuated audio sample signals;

causing a soundfield represented by the position-less audio content and the audio metadata to be rendered by a set of speakers operating with the audio renderer in a specific playback environment, wherein causing a soundfield represented by the position-less audio content and the audio metadata to be rendered by a set of speakers operating with the audio renderer in a specific playback environment includes:
  applying the audio object gains to the set of attenuated audio sample signals.

EEE2. The method as recited in EEE1, wherein the normalization gain is a constant attenuation gain applied by the audio processor with the audio renderer to the set of pre-attenuated audio sample signals.

EEE3. The method as recited in EEE1 or EEE2, wherein the audio metadata includes an audio metadata portion that specifies positions of a set of audio objects represented in the decoded audio content.

EEE4. The method as recited in any of EEE1 to EEE3, wherein the set of attenuated audio sample signals represents a set of audio objects with time-varying spatial positions.

EEE5. The method as recited in any of EEE1 to EEE3, wherein the set of attenuated audio sample signals represents a set of audio channels of a specific audio channel configuration.

EEE6. The method as recited in any of EEE1 to EEE5, wherein the set of pre-attenuated audio sample signals represents a set of pre-attenuated downmixed audio sample signals.

EEE7. A method performed by an audio processor prior to an audio rendering stage, comprising:
  performing attenuation with a normalization gain on a set of pre-attenuated audio sample signals to generate a set of attenuated audio sample signals;
  generating audio object gains based at least in part on an inverse of the normalization gain;
  wherein the attenuation performed by and the audio object gains generated by the audio processor free the audio processor from performing peak limiting operations on the set of pre-attenuated audio sample signals;
  generating a coded bitstream encoded with position-less audio content and audio metadata corresponding to the position-less audio content;
  wherein the position-less audio content includes the set of attenuated audio sample signals; wherein the audio metadata includes the audio object gains;
  causing a soundfield represented by the position-less audio content and the audio metadata to be rendered by a set of speakers in a specific playback environment.

EEE8. The method as recited in EEE7, wherein the set of pre-attenuated audio sample signals represents a set of audio objects with time-varying spatial positions.

EEE9. The method as recited in EEE7, wherein the set of pre-attenuated audio sample signals represents a set of audio channels of a specific audio channel configuration.

EEE10. The method as recited in EEE7, wherein the set of pre-attenuated audio sample signals represents position-less pre-attenuated audio sample data, wherein the set of attenuated audio sample signals represents position-less attenuated audio sample data.

EEE11. A method performed by an audio processor with an audio renderer, comprising:
  receiving and decoding a coded bitstream generated by an upstream audio processor, wherein the coded bitstream is encoded with position-less audio content and audio metadata corresponding to the position-less audio content;
  wherein the position-less audio content includes first audio objects corresponding to a first media content type of two consecutive media content types and second audio objects corresponding to a second media content type of the two consecutive media content types;
  wherein the audio metadata includes first and second audio object gains, respectively for the first and second audio objects, generated at least in part based on a first fading curve of the first media content type and a second fading curve of the second media content type, respectively;
  wherein the first and second audio object gains generated by the upstream audio processor free the upstream audio processor from performing cross-fading operations on the first audio objects of the first media content type and the second audio objects of the second media content type;
  causing a sound field represented by the first and second audio objects to be rendered by a set of speakers operating with the audio renderer in a specific playback environment, wherein causing a sound field represented by the first and second audio objects to be rendered by a set of speakers operating with the audio renderer in a specific playback environment includes:
    applying the first and second audio object gains generated at least in part based on the first and second fading curves to the first and second audio objects, respectively.

EEE12. The method as recited in EEE11, wherein cross fading gain components in the audio object gains approximate the first and second fading curves.

EEE13. A method performed by an audio processor prior to an audio rendering stage, comprising:
  generating first audio object gains, for first audio objects of a first media content type of two consecutive media content types, based at least in part on a first fading curve for the first media content type;
  generating second audio object gains, for second audio objects of a second media content type of the two consecutive media content types, based at least in part on a second fading curve for the second media content type;
  generating a coded bitstream encoded with position-less audio content and audio metadata corresponding to the position-less audio content;
  wherein the position-less audio content includes the first and second audio objects;
  wherein the audio metadata includes the first and second audio object gains;
  wherein the first and second audio object gains generated by the audio processor free the audio processor from performing cross-fading operations on the first audio objects of the first media content type and the second audio objects of the second media content type;
  causing a soundfield represented by the position-less audio content and the audio metadata to be rendered by a set of speakers in a specific playback environment.

EEE14. A method performed by an audio processor with an audio renderer, comprising:
  receiving and decoding a coded bitstream generated by an upstream audio processor, wherein the coded bitstream is encoded with position-less audio content and audio metadata corresponding to the position-less audio content;
  wherein the position-less audio content includes first audio objects corresponding to a first audio program of two or more concurrent audio programs and second audio objects corresponding to a second audio program of the two or more concurrent audio programs;
  wherein the audio metadata includes first and second audio object gains, respectively for the first and second audio objects, generated at least in part based on a first program mixing level of the first audio program and a second program mixing level of the second audio program, respectively;

wherein the first and second audio object gains generated by the upstream audio processor free the upstream audio processor from performing program mixing operations on the first audio objects of the first audio program and the second audio objects of the second audio program;

causing a sound field at least in part represented by the first and second audio objects to be rendered by a set of speakers operating with the audio renderer in a specific playback environment, wherein causing a sound field at least in part represented by the first and second audio objects to be rendered by a set of speakers operating with the audio renderer in a specific playback environment includes:

applying the first and second audio object gains generated at least in part based on the first and second program mixing levels to the first and second audio objects, respectively.

EEE15. The method as recited in EEE14, wherein the first audio program represents at least a part of a main program, wherein the second audio program represents at least a part of an associated program.

EEE16. A method performed by an audio processor prior to an audio rendering stage, comprising:

generating first audio object gains, for first audio objects of a first audio program of two or more concurrent audio programs, based at least in part on a first program mixing level of the first audio program;

generating second audio object gains, for second audio objects of a second audio program of the two or more concurrent audio programs, based at least in part on a second program mixing level of the second audio program;

wherein the first and second audio object gains generated by the audio processor free the audio processor from performing program mixing operations on the first audio objects of the first audio program and the second audio objects of the second audio program;

generating a coded bitstream encoded with position-less audio content and audio metadata corresponding to the position-less audio content;

wherein the position-less audio content includes the first and second audio objects;

wherein the audio metadata includes the first and second audio object gains;

causing a soundfield represented by the position-less audio content and the audio metadata to be rendered by a set of speakers in a specific playback environment.

EEE17. A method performed by an audio processor with an audio renderer, comprising:

receiving and decoding a coded bitstream generated by an upstream audio processor, wherein the coded bitstream is encoded with position-less audio content and audio metadata corresponding to the position-less audio content;

wherein the position-less audio content includes audio objects corresponding to one or more audio programs;

wherein the audio metadata includes audio object gains, for the audio objects, generated by an upstream audio processor before the audio renderer to free the upstream audio processor from performing one or more deferred audio processing operations;

causing a sound field at least in part represented by the audio objects to be rendered by a set of speakers operating with the audio renderer in a specific playback environment, wherein causing a sound field represented by the audio objects to be rendered by a set of speakers operating with the audio renderer in a specific playback environment includes:

applying the audio object gains to the audio objects.

EEE18. The method as recited in EEE17, wherein the one or more deferred audio processing operations comprises at least one of: peak limiting, cross fading, program mixing, or an audio processing operation other than any of the foregoing operations.

EEE19. A method performed by an audio processor prior to an audio rendering stage, comprising:

generating audio object gains, for audio objects of one or more audio programs;

wherein the audio object gains generated by the audio processor free the audio processor from performing one or more deferred audio processing operations;

generating a coded bitstream encoded with position-less audio content and audio metadata corresponding to the position-less audio content;

wherein the position-less audio content includes the audio objects;

wherein the audio metadata includes the audio object gains;

causing a soundfield represented by the position-less audio content and the audio metadata to be rendered by a set of speakers in a specific playback environment.

EEE20. A media processing system configured to perform any one of the methods recited in EEE1-19.

EEE21. An apparatus comprising a processor and configured to perform any one of the methods recited in EEE1-19.

EEE22. A non-transitory computer readable storage medium, comprising software instructions, which when executed by one or more processors cause performance of any one of the methods recited in EEE1-19.

The invention claimed is:

1. A method, performed by a downstream audio rendering stage in an end-to-end audio processing chain, comprising:

receiving and decoding a coded bitstream generated by an upstream audio processor, wherein the coded bitstream is encoded with audio content and audio metadata corresponding to the audio content;

wherein the audio content includes first audio objects corresponding to a first media content type of two consecutive media content types and second audio objects corresponding to a second media content type of the two consecutive media content types;

wherein the audio metadata includes first and second audio object gains, respectively for the first and second audio objects, generated at least in part based on a first fading curve of the first media content type and a second fading curve of the second media content type, respectively;

applying the first and second audio object gains generated at least in part based on the first and second fading curves to the first and second audio objects, respectively;

rendering a sound field represented by the first audio objects with the applied first audio object gains and the second audio objects with the applied second audio object gains, wherein the first audio object gains cause a gradual increase or decrease of a first audio signal associated with the first audio objects over a first specified period of time, and the second audio object gains cause a gradual increase or decrease of a second audio signal associated with the second audio objects over a second specified period of time.

2. The method of claim 1, wherein the first and second audio object gains generated by the upstream audio processor free the upstream audio processor from performing cross-fading operations on the first audio objects of the first media content type and the second audio objects of the second media content type.

3. The method as recited in claim 1, wherein cross fading gain components in the first and second audio object gains approximate the first and second fading curves, respectively.

4. The method of claim 1, wherein the first fading curve and the second fading curve are linear.

5. The method of claim 1, wherein the first fading curve and the second fading curve are determined by interpolating at least two consecutive first audio object gains and two consecutive second audio object gains, respectively.

6. The method of claim 5, wherein a minimum number of audio samples representing the audio content is used between metadata updates, wherein the metadata updates are associated to a particular audio sample.

7. The method of claim 6, wherein the metadata updates are a maximum of eight per frame.

8. The method of claim 1, further comprising supporting, by the downstream audio rendering stage, long term and short-term cross fading.

9. The method of claim 1, wherein the first and second object gains are generated at least in part based on selected dynamic range compression curves and wherein the method further comprises applying the first and second object gains to one or more loudness levels in one or more types of loudness levels represented by first and second audio objects to achieve a target loudness levels for a specific playback environment.

10. The method of claim 9, wherein the selected dynamic range compression curves are smoothed with a time constant.

11. An audio object decoder comprising an audio rendering stage configured to perform the method according to claim 1.

12. The method according to claim 1, wherein the audio content is position-less.

13. A non-transitory computer readable storage medium, comprising software instructions, which when executed by one or more processors cause the one or more processors to perform the method of claim 1.

14. A method performed by an upstream audio processor prior to a downstream audio rendering stage in an end-to-end audio processing chain, comprising:

generating first audio object gains, for first audio objects of a first media content type of two consecutive media content types, based at least in part on a first fading curve for the first media content type, wherein the first audio object gains cause a gradual increase or decrease of a first audio signal associated with the first audio objects over a first specified period of time during rendering;

generating second audio object gains, for second audio objects of a second media content type of the two consecutive media content types, based at least in part on a second fading curve for the second media content type, wherein the second audio object gains cause a gradual increase or decrease of a second audio signal associated with the second audio objects over a second specified period of time during rendering;

generating a coded bitstream encoded with audio content and audio metadata corresponding to the audio content;

wherein the audio content includes the first and second audio objects;

wherein the audio metadata includes the first and second audio object gains;

sending the coded bitstream to the downstream audio rendering stage.

15. The method of claim 14, wherein the first and second audio object gains generated by the upstream audio processor free the upstream audio processor from performing cross-fading operations on the first audio objects of the first media content type and the second audio objects of the second media content type.

16. The method of claim 14, wherein the first and second object gains are generated at least in part based on selected dynamic range compression curves and wherein the method further comprises applying the first and second object gains to one or more loudness levels in one or more types of loudness levels represented by first and second audio objects to achieve a target loudness levels for a specific playback environment.

17. The method of claim 16, wherein the selected dynamic range compression curves are smoothed with a time constant.

18. The method according to claim 14, wherein the audio content is position-less.

19. An encoder comprising an audio processor configured to perform the method of claim 14.

20. A non-transitory computer readable storage medium, comprising software instructions, which when executed by one or more processors cause the one or more processors to perform the method of claim 14.

* * * * *